(12) United States Patent
Yamashita et al.

(10) Patent No.: US 7,088,596 B2
(45) Date of Patent: Aug. 8, 2006

(54) SWITCHING POWER SUPPLY WITH NOVEL COMMON MODE FILTER ARRANGEMENT

(75) Inventors: Mikihiro Yamashita, Echi-gun (JP);
Yoshinori Katsura, Hikone (JP);
Seiichi Iwao, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 203 days.

(21) Appl. No.: 10/758,288

(22) Filed: Jan. 16, 2004

(65) Prior Publication Data

US 2004/0218407 A1    Nov. 4, 2004

(30) Foreign Application Priority Data

Jan. 17, 2003    (JP)    .............................. 2003-010363

(51) Int. Cl.
*H02M 1/14*    (2006.01)
(52) U.S. Cl. .............................. 363/20; 363/37; 363/44
(58) Field of Classification Search ................. 363/20, 363/37, 39, 44, 47
See application file for complete search history.

(56) References Cited

U.S. PATENT DOCUMENTS

| | | | | |
|---|---|---|---|---|
| 4,523,131 A * | 6/1985 | Zansky | ........................ | 315/307 |
| 4,683,529 A * | 7/1987 | Bucher, II | .................... | 363/44 |
| 4,888,675 A * | 12/1989 | Kumar et al. | ................. | 363/47 |
| 5,077,543 A * | 12/1991 | Carlile | ......................... | 333/177 |
| 5,111,373 A * | 5/1992 | Higaki | ......................... | 363/37 |
| 5,513,088 A * | 4/1996 | Williamson | .............. | 363/21.18 |
| 5,636,112 A * | 6/1997 | Faulk | .......................... | 363/48 |
| 5,740,026 A * | 4/1998 | Karol | ........................... | 363/86 |
| 6,018,221 A * | 1/2000 | Ohtake | ....................... | 315/307 |
| 6,151,228 A * | 11/2000 | Miyazaki et al. | .............. | 363/48 |
| 6,163,470 A * | 12/2000 | Chavez et al. | ................. | 363/53 |
| 6,272,030 B1 * | 8/2001 | Oomura | ....................... | 363/62 |
| 6,288,917 B1 * | 9/2001 | Redburn et al. | ............... | 363/39 |
| 6,404,179 B1 * | 6/2002 | Sugiura et al. | ............. | 323/355 |
| 6,717,827 B1 * | 4/2004 | Ota | ......................... | 363/21.12 |
| 6,735,097 B1 * | 5/2004 | Prasad et al. | .................. | 363/44 |
| 6,781,444 B1 * | 8/2004 | Pelly | ........................... | 327/552 |
| 6,847,530 B1 * | 1/2005 | James | .......................... | 363/39 |

* cited by examiner

*Primary Examiner*—Jeffrey Sterrett
(74) *Attorney, Agent, or Firm*—Sughrue Mion, PLLC

(57) ABSTRACT

The present invention is to provide a switching power supply device for preventing the change of characteristic of the line filter due to filler such as resin which covers the circuits. A switching power supply device is disclosed which comprise a rectifier 1 for full wave rectification of the input of the utility power supply, a condenser 2 for smoothing the output of the rectifier 1, a line filter 3 consisting of a first coil 3a which is connected in series to a high voltage side output of the rectifier 1 and a second coil 3b which is connected in series to a low voltage side output of the rectifier 1 via the condenser 2, a condenser 4 for smoothing the output of the line filter 3, a series circuit of a primary winding 5a of a transformer 5 which is connected in parallel to the condenser 4 and a switching element 6, a diode 7 for half-wave rectification of the output of a secondary winding 5b of the transformer 5, and a condenser 8 connected between output terminals of the secondary winding 5b via the diode 7, wherein a diode 10a is connected in a forward direction from an input of the second coil 3b of the line filter 3 to an output of the first coil 3a of the line filter 3.

5 Claims, 5 Drawing Sheets

Prior Art

SWITCHING POWER SUPPLY WITH NOVEL COMMON MODE FILTER ARRANGEMENT

BACKGROUND OF THE INVENTION

1. Field of the Invention

The present invention relates to a switching power supply device.

2. Description of the Related Art

Referring to FIG. 5 which shows a constitution of a conventional switching power supply device, the switching power supply device comprises a line filter 101 consisting of coils 101a, 101b each of which is connected in series to each input line of an utility power supply (AC) grounded to a protect earth, a rectifier 102 consisting of four diodes 102a~102d which are bridge-connected for full-wave rectification of the output of the line filter 101, a smoothing condenser 105 for smoothing the rectified output of a rectifier 102, and a DC/DC converter 106 for converting a voltage across both ends of the smoothing condenser into a predetermined voltage. Condensers (Y condensers) 103, 104 are connected respectively between each output of the line filter 101 and the earth.

In the above-described conventional embodiment, in order to reduce the normal mode noise or common mode noise, the line filter 101 and the condensers 103, 104, which are Y condenser, are used in combination as a countermeasure against noise. In the other case, X condenser is connected between input lines (For example, refer to lines 17 to 25, left column, page 2 and FIG. 3 of Japanese Patent Unexamined Publication JP-A 11-113246 (1999).

In another case, the line filter is connected to a DC line at the output side of the rectifier 102 instead of the input line of the utility power supply (AC). In this case, the line filter is used as a countermeasure against conductive noise while taking resistibility to DC voltage into account, although it is not the inherent use of the line filter.

Such switching power supply device is used in a charger and the like. In view of waterproof and heatproof, filler made of resin and the like is filled within the charger incorporated the switching power supply device in a manner that the filler covers the entire circuit module.

In case where the filler is filled so as to cover the entire circuit module as in the above-described conventional switching power supply device, the effect of waterproof and heatproof is improved. However, the line capacity or impedance of the line filter 101 of the switching power supply device is changed due to the pressure of the filled filler and the like, and hence the frequency characteristic is also changed so that the effect of the line filter 101 is not exhibited as aimed. Therefore, there was a problem that the noise level of the switching power supply device is deteriorated on the contrary due to the filling of filler although the line filter 101 is used.

SUMMARY OF THE INVENTION

The present invention is to solve the foregoing problems, and it is an object of the present invention to provide a switching power supply device for preventing the change of characteristic of a line filter due to filler such as resin which covers the circuits.

According to one aspect of the invention, there is provided a switching power supply device comprising: a rectifier for rectifying the AC input, a line filter consisting of a first coil which is connected in series to a high voltage side output of the rectified output of the rectifier and a second coil which is connected in series to a low voltage side output of the rectified output of the rectifier, a transformer of which a primary winding is connected to an output of the line filter, and a switching element for energizing and de-energizing the primary winding of the transformer, the switching power supply device being filled with resin to cover the entire circuit module, wherein the switching power supply device further comprises at least one diode which is connected in a forward direction from an input of the second coil to an output of the first coil and/or at least one diode which is connected in a forward direction from an output of the second coil to an input of the first coil.

According to the other aspect of the invention, there is provided a switching power supply device comprising: a rectifier for rectifying the AC input, a line filter consisting of a first coil which is connected in series to a high voltage side output of the rectified output of the rectifier and a second coil which is connected in series to a low voltage side output of the rectified output of the rectifier, a transformer of which a primary winding is connected to an output of the line filter, and a switching element for energizing and de-energizing the primary winding of the transformer, the switching power supply device being filled with resin to cover the entire circuit module, wherein the switching power supply device further comprises at least one condenser which is connected between an output of the first coil and an input of the second coil and/or at least one condenser which is connected between an input of the first coil and an output of the second coil.

According to another aspect of the invention, there is provided a switching power supply device comprising: a rectifier for rectifying the AC input, a line filter consisting of a first coil which is connected in series to a high voltage side output of the rectified output of the rectifier and a second coil which is connected in series to a low voltage side output of the rectified output of the rectifier, a transformer of which a primary winding is connected to an output of the line filter, and a switching element for energizing and de-energizing the primary winding of the transformer, the switching power supply device being filled with resin to cover the entire circuit module, wherein the switching power supply device further comprises a condenser which is connected in parallel to the first coil and/or the second coil.

According to further another aspect of the invention, a switching power supply device further comprises a condenser which is connected in parallel to the first coil and/or the second coil, in addition to the constitution of above-described one aspect or the other aspect.

DETAILED DESCRIPTION OF THE PREFERRED EMBODIMENTS

Preferred embodiments of the present invention will now be described in detail with reference to accompanying drawings.

First Embodiment

Figure 1:
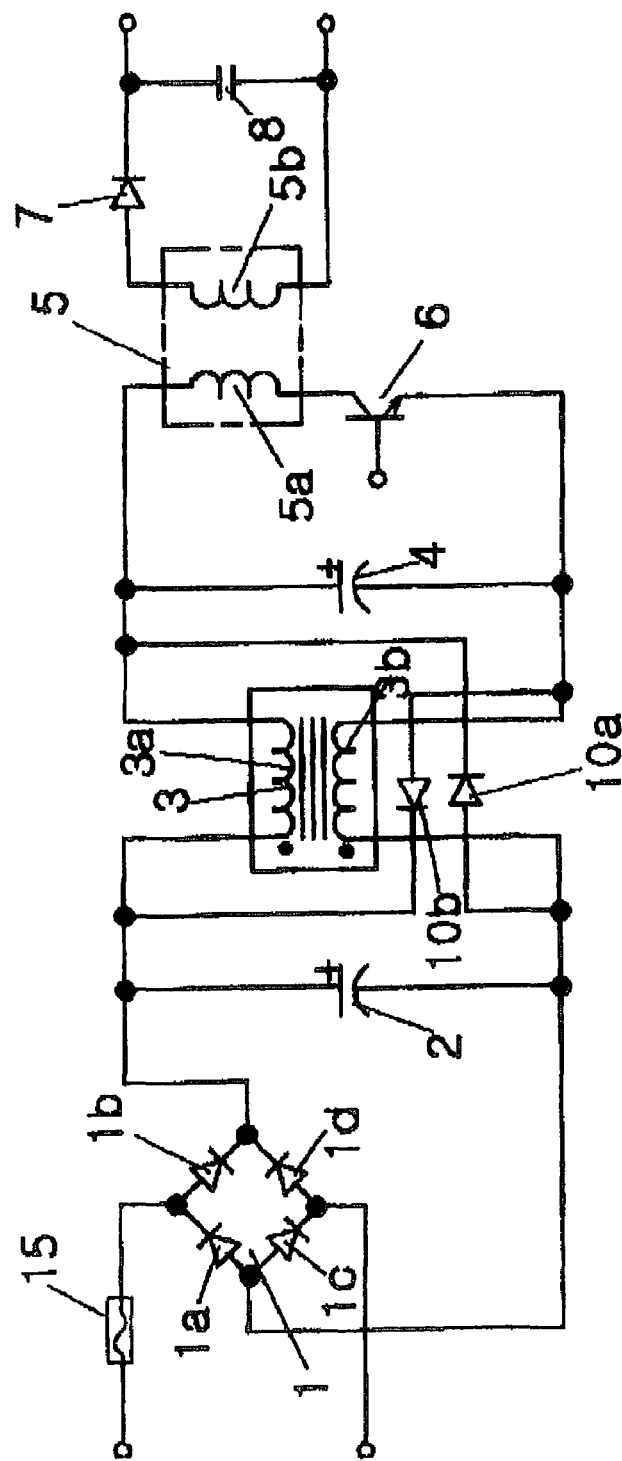
FIG. 1 is a circuit diagram showing a constitution of a switching power supply device according to a first embodiment of the present invention.

As shown in FIG. 1, a switching power supply device according to a first embodiment comprises a fuse 15 which is connected in series to an input line of an utility power supply (not shown), a rectifier 1 consisting of four diodes 1a~1d which are bridge-connected for full wave rectification of the input of the utility power supply, a condenser 2 for smoothing the output of the rectifier 1, a line filter 3 consisting of a first coil 3a which is connected in series to a high voltage side output of the rectifier 1 and a second coil 3b which is connected in series to a low voltage side output of the rectifier 1 via the condenser 2, a condenser 4 for smoothing the output of the line filter 3, a series circuit of a primary winding 5a of a transformer 5 which is connected in parallel to the condenser 4 and a switching element 6, a diode 7 for half-wave rectification of the output of a secondary winding 5b of the transformer 5, and a condenser 8 connected between output terminals of the secondary winding 5b via the diode 7. A diode 10a is connected in a forward direction from an input (ground line) of the second coil 3b of the line filter 3 to an output (power supply line) of the first coil 3a of the line filter 3.

In the switching power supply device as described in the above, when the switching element 6 is turned on and off to energize and de-energize the primary winding 5a of the transformer 5, a voltage is derived to the secondary winding 5b of the transformer 5 and thereby a voltage is generated across opposite ends of the condenser 8.

Such switching power supply device is used in a charger, and filler such as resin is filled within the charger incorporating the switching power supply device in a manner that the filler covers the entire circuit module in consideration of waterproof and heatproof as in the conventional switching power supply device. However, the line capacity, as a whole system of the line filter 3 which is changed by the filler, is compensated by means of a floating capacity component existent in the diode 10a which is connected in a forward direction from the input of the second coil 3b of the line filter 3 to the output of the first coil 3a of the line filter 3. Moreover, the balance of the line filter 3 restores the collapsed frequency characteristic to the frequency characteristic that was aimed before filling the filler, so that the noise level which is deteriorated due to the filling of filler is relieved and thereby it is possible to lower the noise level.

Because the floating capacity inherently existent in the diode 10a is much small, the balance of the line filter 3 is adapted to compensate the collapsed frequency characteristic.

Furthermore, as represented by broken line in FIG. 1, the switching power supply device may have a diode 10b which is connected in a forward direction from an output (ground line) of the second coil 3b of the line filter 3 to an input (power supply line) of the first coil 3a of the line filter 3. When any one of the diode 10a and the diode 10b is provided, the same effect explained in the above can be obtained.

In the illustrated embodiment, although each diode 10a, 10b is constituted by one diode, they may be constituted by plural diodes, respectively.

Second Embodiment

Figure 2:
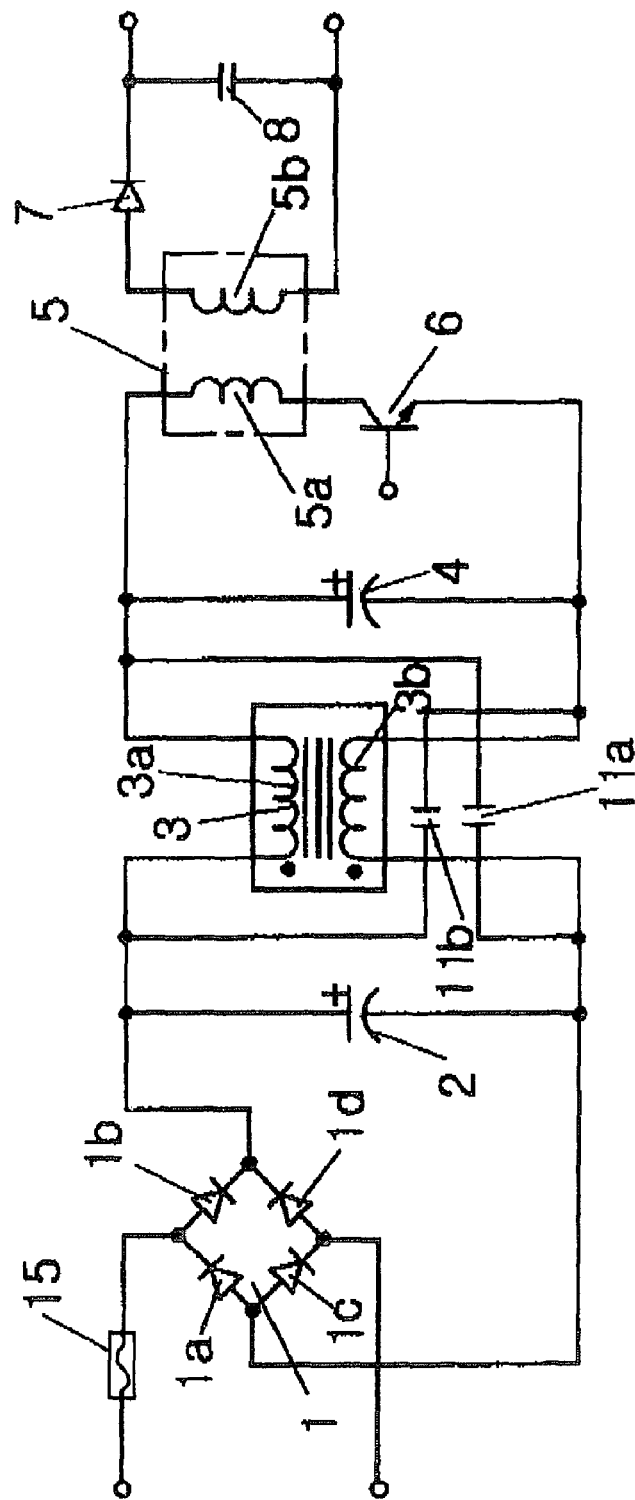
FIG. 2 a circuit diagram showing a constitution of a switching power supply device according to a second embodiment of the present invention.

The constitution of a switching power supply device according to a second embodiment is shown in FIG. 2. In the second embodiment, the diode 10a of the first embodiment is replaced by a condenser 11a and other components are the same as those of the first embodiment. Accordingly, the same components as those of the first embodiment are designated with same reference numerals and explanation thereof is omitted.

Here, the line capacity, as a whole system of the line filter 3 which is changed by filing the filler such as resin, can be compensated in response to a capacity of the condenser 11a. Moreover, the balance of the line filter 3 restores the collapsed frequency characteristic to the frequency characteristic that was aimed before filling the filler, so that the noise level which is deteriorated due to the filling of filler is relieved and thereby it is possible to lower the noise level.

Furthermore, by finely selecting the capacity of the condenser 11a, the line capacity of the line filter 3 can be compensated precisely and the frequency characteristic of the line filter 3 can be restored to the aimed frequency characteristic with high accuracy.

Furthermore, as represented by broken line in FIG. 2, the switching power supply device may have a condenser 11b which is connected between the input (power supply line) of the first coil 3a and the output (ground line) of the second coil 3b. When any one of the condenser 11a and the condenser 11b is provided, the same effect explained in the above can be obtained.

In the illustrated embodiment, although each condenser 11a, 11b is constituted by one condenser, they may be constituted by plural condensers, respectively.

Third Embodiment

Figure 3:
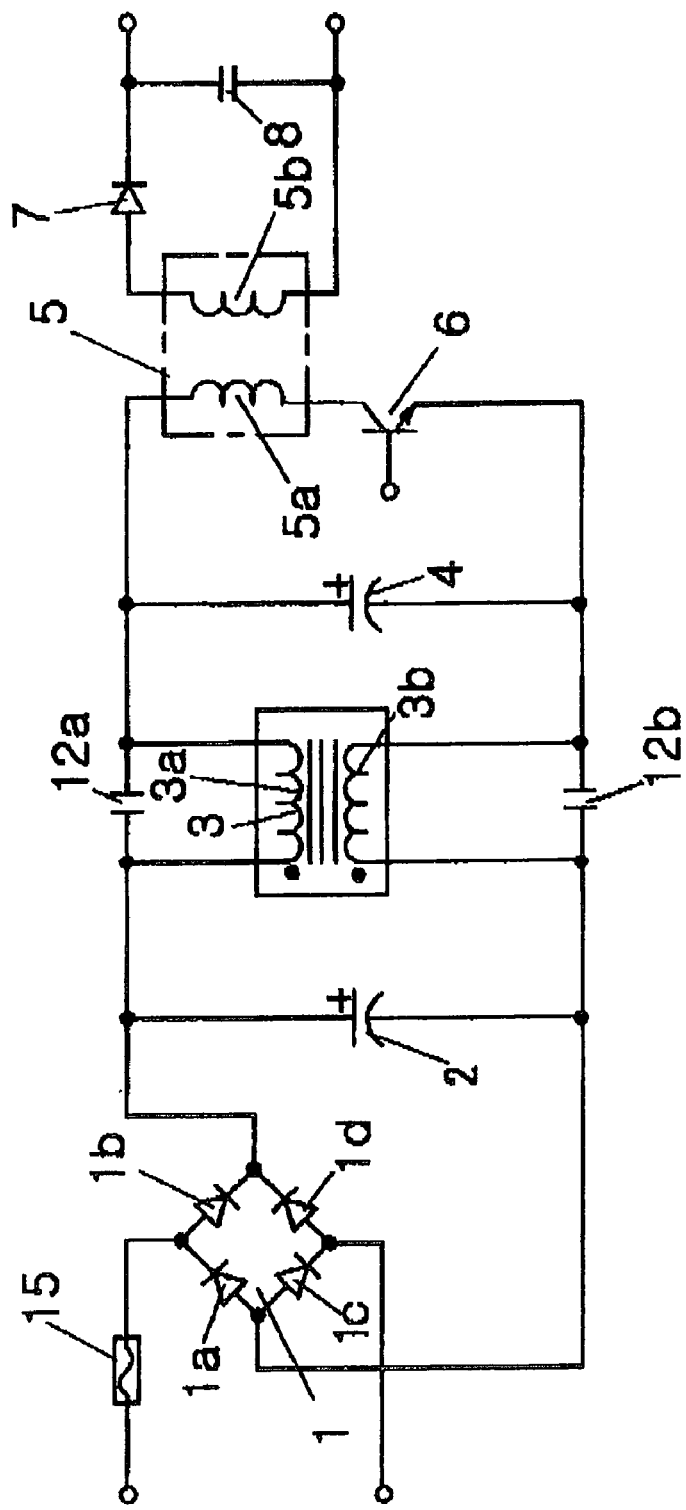
FIG. 3 a circuit diagram showing a constitution of a switching power supply device according to a third embodiment of the present invention.

The constitution of a switching power supply device according to a third embodiment is shown in FIG. 3. In the third embodiment, the diode 10a of the first embodiment is omitted and a condenser 12a which is connected in parallel to the first coil 3a at the power supply line side is added. The same components as those of the first embodiment are designated with same reference numerals and explanation thereof is omitted.

Here, the line capacity of the line filter 3 which is changed by filing the filler such as resin, can be compensated in response to a capacity of the condenser 12a. Moreover, the balance of the line filter 3 restores the collapsed frequency characteristic to the frequency characteristic that was aimed before filling the filler, so that the noise level which is deteriorated due to the filling of filler is relieved and thereby it is possible to lower the noise level.

Because the condenser 12a is connected in parallel to the first coil 3a and opposite ends thereof are connected to the same line, the withstand voltage thereof may be low and thereby it is advantageous in terms of costs and mounting space.

Furthermore, as represented by broken line in FIG. 3, the switching power supply device may have a condenser 12b which is connected in parallel to the second coil 3b at the ground line side. When any one of the condenser 12a and the condenser 12b is provided, the same effect explained in the above can be obtained. Accordingly, in the third embodiment, the line capacity of the line filter 3 can be compensated for every coil.

In the illustrated embodiment, although each condenser 12a, 12b is constituted by one condenser, they may be constituted by plural condensers, respectively.

Fourth Embodiment

Figure 4:
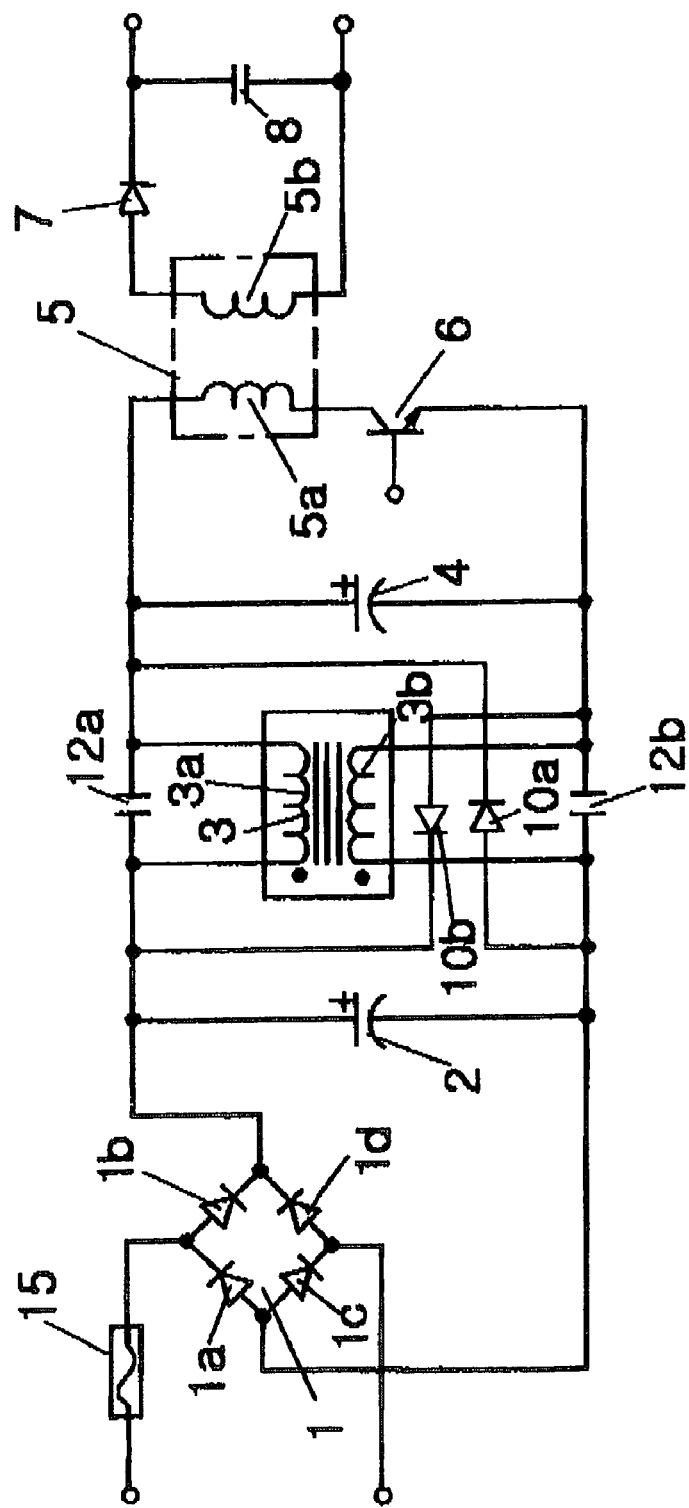
FIG. 4 a circuit diagram showing a constitution of a switching power supply device according to a fourth embodiment of the present invention.
Figure 5:
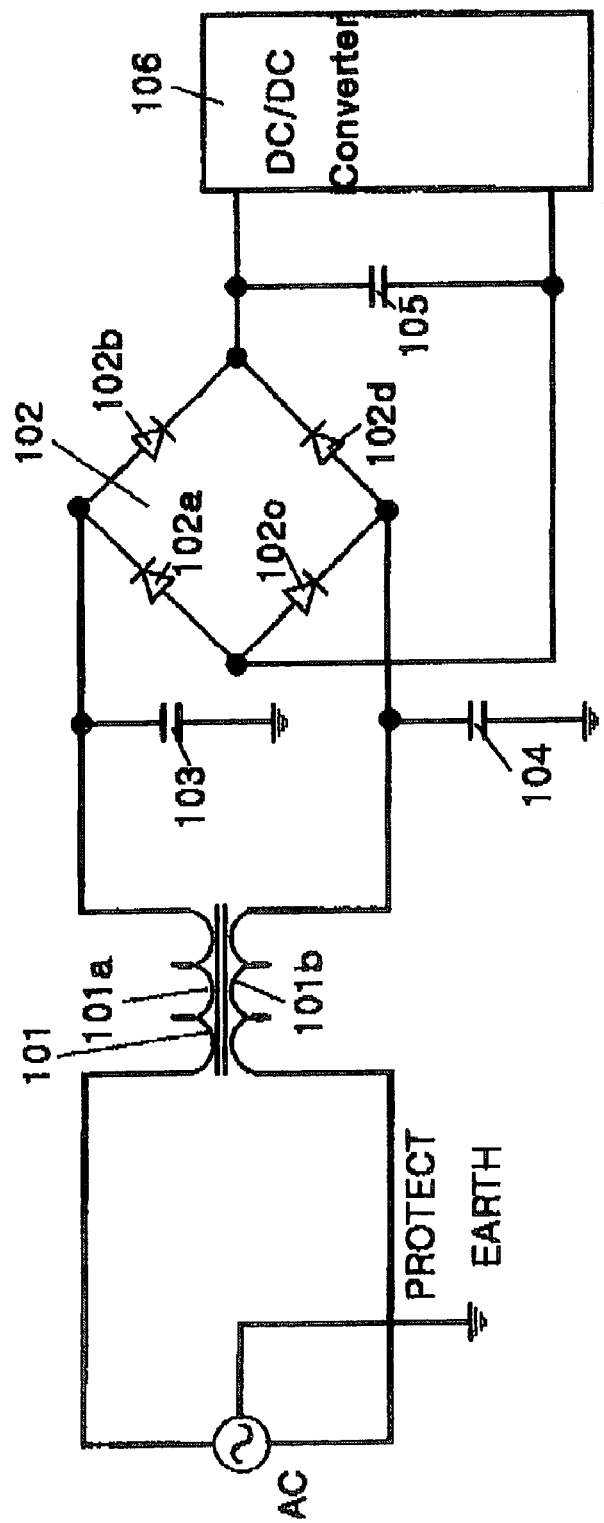
FIG. 5 a circuit diagram showing a constitution of a conventional switching power supply device.

The constitution of a switching power supply device according to a fourth embodiment is shown in FIG. 4. In the fourth embodiment, the condenser 12a explained in the third embodiment is added to the constitution of the first embodiment so that combined effect of the first embodiment and the third embodiment can be possessed.

Here, the line capacity, as a whole system of the line filter 3 which is changed by filing the filler such as resin, can be compensated in response to a floating capacity component of the diode 10a and a capacity of the condenser 12a, and the line capacity of the line filter 3 can be compensated for every coil. Moreover, the balance of the line filter 3 restores the collapsed frequency characteristic to the frequency characteristic that was aimed before filling the filler, so that the noise level which is deteriorated due to the filling of filler is relieved and thereby it is possible to lower the noise level.

Furthermore, as represented by broken line in FIG. 4, the switching power supply device may have the diode 10b which is connected in a forward direction from the output (ground line) of the second coil 3b of the line filter 3 to the input (power supply line) of the first coil 3a of the line filter 3, and the condenser 12b which is connected in parallel to the second coil 3b at the ground line side. When any one of the diode 10a and the diode 10b and any one of the condenser 12a and the condenser 12b are provided, the same effect explained in the above can be obtained.

In the illustrated embodiment, although each diode 10a, 10b and each condenser 12a, 12b are constituted by one diode and one condenser, respectively, they may be constituted by plural diodes and plural condensers, respectively.

Alternatively, the diodes 10a, 10b may be replaced by the condensers 11a, 11b explained in the second embodiment, to possess the combined effect of the second embodiment and the third embodiment.

As a resin for covering the entire circuit module in the embodiments described in the above, urethane, epoxy and the like are used. In consideration of the fire retardancy, urethane is preferable.

The switching power supply device according to the present invention as described in the above has superior effects as follows:

In the first embodiment, a switching power supply device comprises a rectifier for rectifying the AC input, a line filter consisting of a first coil which is connected in series to a high voltage side output of the rectified output of the rectifier and a second coil which is connected in series to a low voltage side output of the rectified output of the rectifier, a transformer of which a primary winding is connected to an output of the line filter, and a switching element for energizing and de-energizing the primary winding of the transformer, the switching power supply device being filled with resin to cover the entire circuit module. The switching power supply device further comprises at least one diode which is connected in a forward direction from an input of the second coil to an output of the first coil and/or at least one diode which is connected in a forward direction from an output of the second coil to an input of the first coil.

Therefore, the line capacity, as a whole system of the line filter which is changed by the filler, is compensated by means of a floating capacity component of the diode, to prevent the change of line filter characteristic. Moreover, the balance of the line filter restores the collapsed frequency characteristic to the frequency characteristic that was aimed before filling the filler, so that the noise level which is deteriorated due to the filling of filler is relieved and thereby it is possible to lower the noise level.

In the second embodiment of the invention, a switching power supply device comprises a rectifier for rectifying the AC input, a line filter consisting of a first coil which is connected in series to a high voltage side output of the rectified output of the rectifier and a second coil which is connected in series to a low voltage side output of the rectified output of the rectifier, a transformer of which a primary winding is connected to an output of the line filter, and a switching element for energizing and de-energizing the primary winding of the transformer, the switching power supply device being filled with resin to cover the entire circuit module. The switching power supply device further comprises at least one condenser which is connected between an output of the first coil and an input of the second coil and/or at least one condenser which is connected between an input of the first coil and an output of the second coil.

Therefore, the line capacity, as a whole system of the line filter which is changed by filing the filler such as resin, can be compensated in response to a capacity of the condenser, to prevent the change of line filter characteristic. Moreover, the balance of the line filter restores the collapsed frequency characteristic to the frequency characteristic that was aimed before filling the filler, so that the noise level which is deteriorated due to the filling of filler is relieved and thereby it is possible to lower the noise level. Furthermore, by finely selecting the capacity of the condenser, the line capacity of the line filter can be compensated precisely and the frequency characteristic of the line filter can be restored to the aimed frequency characteristic with high accuracy.

In the third embodiment of the invention, a switching power supply device comprises a rectifier for rectifying the AC input, a line filter consisting of a first coil which is connected in series to a high voltage side output of the rectified output of the rectifier and a second coil which is connected in series to a low voltage side output of the rectified output of the rectifier, a transformer of which a primary winding is connected to an output of the line filter, and a switching element for energizing and de-energizing the primary winding of the transformer, the switching power supply device being filled with resin to cover the entire circuit module. The switching power supply device further comprises a condenser which is connected in parallel to the first coil and/or the second coil.

Therefore, the line capacity of the line filter which is changed by filing the filler such as resin, can be compensated for each coil in response to a capacity of the condenser, to prevent the change of line filter characteristic. Moreover, the balance of the line filter restores the collapsed frequency characteristic to the frequency characteristic that was aimed before filling the filler, so that the noise level which is deteriorated due to the filling of filler is relieved and thereby it is possible to lower the noise level. Additionally, the condenser does not necessarily have high withstand voltage and thereby it is advantageous in terms of costs and mounting space.

In the fourth embodiment of the invention, a switching power supply device further comprises a condenser which is connected in parallel to the first coil and/or the second coil in addition to the constitution of the first or the second embodiment.

Therefore, the line capacity, as a whole system of the line filter which is changed by filing the filler such as resin, can be compensated in response to a floating capacity component of the diode and a capacity of the condenser. Furthermore, the line capacity of the line filter can be compensated for every coil, so that the synergistic effect of both compensations is anticipated. Accordingly, the noise level which is deteriorated due to the filling of filler is more relieved.

The present invention has been described in an illustrative manner, and it is to be understood that the terminology used is intended to be in the nature of description rather than of limitation. Various modifications and variations of the present invention are possible in light of the above teachings. Therefore, it is to be understood that within the scope of the appended claims, the invention may be practiced otherwise than as specifically described.

What is claimed is:

1. A switching power supply device comprising:
a rectifier for rectifying the AC input;
a line filter consisting of a first coil which is connected in series to a high voltage side output of the rectified output of the rectifier and a second coil which is connected in series to a low voltage side output of the rectified output of the rectifier;
a transformer of which a primary winding is connected to an output of the line filter; and
a switching element for energizing and de-energizing the primary winding of the transformer, the switching power supply device being filled with resin to cover the entire circuit module,
wherein the switching power supply device further comprises at least one diode which is connected in a forward direction from an input of the second coil to an output of the first coil and/or at least one diode which is connected in a forward direction from an output of the second coil to an input of the first coil.

2. A switching power supply device according to claim 1, further comprising a condenser which is connected in parallel to the first coil and/or the second coil.

3. A switching power supply device comprising:
a rectifier for rectifying the AC input;
a line filter consisting of a first coil which is connected in series to a high voltage side output of the rectified output of the rectifier and a second coil which is connected in series to a low voltage side output of the rectified output of the rectifier;
a transformer of which a primary winding is connected to an output of the line filter; and
a switching element for energizing and de-energizing the primary winding of the transformer, the switching power supply device being filled with resin to cover the entire circuit module,
wherein the switching power supply device further comprises at least one condenser which is connected between an output of the first coil and an input of the second coil and/or at least one condenser which is connected between an input of the first coil and an output of the second coil.

4. A switching power supply device according to claim 2, further comprising a condenser which is connected in parallel to the first coil and/or the second coil.

5. A switching power supply device comprising:
a rectifier for rectifying the AC input;
a line filter consisting of a first coil which is connected in series to a high voltage side output of the rectified output of the rectifier and a second coil which is connected in series to a low voltage side output of the rectified output of the rectifier;
a transformer of which a primary winding is connected to an output of the line filter; and
a switching element for energizing and de-energizing the primary winding of the transformer, the switching power supply device being filled with resin to cover the entire circuit module,
wherein the switching power supply device further comprises a condenser which is connected in parallel to the first coil and/or the second coil.

* * * * *

UNITED STATES PATENT AND TRADEMARK OFFICE
CERTIFICATE OF CORRECTION

PATENT NO. : 7,088,596 B2
APPLICATION NO. : 10/758288
DATED : August 8, 2006
INVENTOR(S) : Mikihiro Yamashita, Yoshinori Katsura and Seiichi Iwao Page 1 of 1

It is certified that error appears in the above-identified patent and that said Letters Patent is hereby corrected as shown below:

Claim 4. A switching power supply device according to claim 2̶3, further comprising a condenser which is connected in parallel to the first coil and or the second coil.

Signed and Sealed this

Seventh Day of November, 2006

JON W. DUDAS
*Director of the United States Patent and Trademark Office*